United States Patent
Pike et al.

(10) Patent No.: US 7,266,818 B2
(45) Date of Patent: Sep. 4, 2007

(54) AUTOMATED SYSTEM SETUP

(75) Inventors: Nicky D. Pike, Sammamish, WA (US);
Michio Nikaido, Issaquah, WA (US);
Ram G. Hariharan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/184,215

(22) Filed: Jun. 28, 2002

(65) Prior Publication Data

US 2004/0006688 A1   Jan. 8, 2004

(51) Int. Cl.
G06F 9/445   (2006.01)
G06F 15/177   (2006.01)

(52) U.S. Cl. ...................... 717/176; 709/222
(58) Field of Classification Search ........ 717/174–178; 705/56
See application file for complete search history.

(56) References Cited

U.S. PATENT DOCUMENTS

| | | | |
|---|---|---|---|
| 5,367,686 A | | 11/1994 | Fisher et al. |
| 5,394,547 A | | 2/1995 | Correnti et al. |
| 5,596,723 A | * | 1/1997 | Romohr ...................... 709/222 |
| 5,717,930 A | * | 2/1998 | Imai et al. ................... 717/176 |
| 5,742,829 A | | 4/1998 | Davis et al. |
| 5,758,071 A | * | 5/1998 | Burgess et al. ............. 709/220 |
| 5,978,590 A | * | 11/1999 | Imai et al. ................... 717/177 |
| 5,982,741 A | * | 11/1999 | Ethier ......................... 370/201 |
| 6,067,582 A | * | 5/2000 | Smith et al. .................... 710/5 |
| 6,094,679 A | | 7/2000 | Teng et al. |
| 6,202,206 B1 | | 3/2001 | Dean et al. |
| 6,209,031 B1 | | 3/2001 | Casey et al. |
| 6,269,480 B1 | | 7/2001 | Curtis |
| 6,282,712 B1 | * | 8/2001 | Davis et al. ................. 717/170 |
| 6,347,398 B1 | | 2/2002 | Parthasarathy et al. |
| 6,468,160 B2 | | 10/2002 | Eliott |
| 6,712,704 B2 | | 3/2004 | Eliott |
| 6,769,989 B2 | | 8/2004 | Smith et al. |
| 6,854,009 B1 | * | 2/2005 | Hughes ....................... 709/220 |
| 6,857,012 B2 | * | 2/2005 | Sim et al. .................... 709/222 |
| 6,912,206 B1 | * | 6/2005 | Valentine et al. ........... 370/255 |
| 6,963,981 B1 | * | 11/2005 | Bailey et al. .................. 726/22 |
| 2002/0194584 A1 | * | 12/2002 | Suorsa et al. ............... 717/176 |
| 2004/0015957 A1 | * | 1/2004 | Zara et al. ................... 717/174 |
| 2004/0162137 A1 | | 8/2004 | Eliott |

OTHER PUBLICATIONS

Paul Thurrott, "Customizing a Windows 2000 Pro Installation, A Windows 2000 technology showcase", Mar. 14, 2000.*

J. Martin, "Principles of Object Oriented Analysis and Design," 1993, PTR Prentice Hall, pp. 301-307.*

Rauch, et al; "Partition Repositories for Partition Cloning-OS Independent Software Maintenance in Large Clusters of PCs"; Proceedings IEEE International Conference on Cluster Computing, CLUSTER 2000; pp. 233-242; Nov. 28-Dec. 1, 2000.

Ressman, et al; "Automated Replacement of System Software Units"; IBM Technical Disclosure Bulletin; vol. 13, No. 10; pp. 3137-3138; Mar. 1971.

(Continued)

Primary Examiner—Meng-Al T. An
Assistant Examiner—Trenton J. Roche
(74) Attorney, Agent, or Firm—Lee & Hayes, PLLC

(57) ABSTRACT

Automated system setup includes automated configuration of an operating system on a computing device(s), automated configuration of custom software on a computing device(s), and/or automated configuration of a network switch(es). The various information used for the automated configuration(s) can also optionally be maintained for asset tracking purposes.

29 Claims, 11 Drawing Sheets

OTHER PUBLICATIONS

Valdes, et al; "Use of Clengine for Automated; Multiplatform Software and Patch Distribution"; Proceedings of the Fourteenth Systems Administration Conference (LISA XIV) pp. 207-218; Dec. 3-8, 2000.

Gauthier, et al.; "Automatic Generation and Targeting of Application Specific Operating Systems and Embedded Systems Software"; Proceedings Design, Automation and Test in Europe; Conference and Exhibition 2001; pp. 679-685; Mar. 13-16, 2001.

"Symantec Ghost 7.5"; Symantec Enterprise Administration; 4 pages, 2001.

"Enabling a Lower-Cost, Successful Migration Process"; Symantec Enterprise Administration; 12 pages; 2001.

"How to Automate Windows 2000 Setup and Domain Controller Setup (Q224390)"; Microsoft Corporation; 2 pages; printed May 20, 2002.

"Using an Answer File for an Unattended Installation (Q136153)"; http://support.microsoft.com; printed May 18, 2002; 3 pages.

"Symantec's New Norton Ghost 2002 Delivers Powerful Tools for System Upgrading and System Protection"; Symantec. press center; 2 pages; Sep. 5, 2001.

"Sample answer file for unattended installatio of Windows MUI"; Global software development; http://www.microsoft.com/globadev/win2k/setup/answer.asp. printed May 18, 2002; 2 pages.

"HOW TO: Unattended Setup Parameters for Unattend.txt File (Q155197)"; printed May 20, 2002; pp. 1-30.

"HOW TO: Perform an Unattended Installation of Windows from a CD-ROM (Q216258)"; Microsoft Corporation; printed May 20, 2002. pp. 1-3.

* cited by examiner

AUTOMATED SYSTEM SETUP

TECHNICAL FIELD

This invention relates to setting up systems, and particularly to automated system setup.

BACKGROUND

Computers typically execute one or more programs that control the overall operation of the computer, commonly referred to as an operating system. Once the operating system is installed, additional application software, commonly referred to as application programs, can be installed that allow the computer to carry out its intended functionality. However, as the power and functionality of computer hardware and software has increased, the amount of time involved in installing the operating system and application programs has also increased. Currently, installing the operating system as well as the application programs can take a significant amount of time. It is not uncommon for such installation processes to take on the order of one to two hours.

Installing the operating system and application programs on a computing device is a task typically performed by a user. During the installation process, an installation program runs to install the operating system or application program. The installation program frequently asks numerous questions that the user must answer regarding the configuration of the computer, operating system, and/or application programs. These questions are typically answered by the user and thus require the user to be present during the installation process. This tends to be tedious on the part of the user, and also introduces the possibility of mistakes being made by the user during the installation process (e.g., incorrect answers being given to the installation program).

In some situations, cloning methods can be used to duplicate a computer disk drive that has an operating system and application programs already installed. This duplicate can then be copied to the disk drives of additional computers, thereby setting up the additional computers identically to the original computer. However, there are also problems with cloning methods because they do not easily account for minor changes in hardware between the computers, and any customization of the computer after the duplicate has been copied to it (e.g., in order to change its network address or other security information) must be performed manually at the computer.

In other situations, an unattended install method can be used to allow a user to generate an answer file and make the answer file available to the installation program. Thus, by "pre-answering" the installation questions the user need not be present to answer all of the questions as they are posed by the installation program. However, the user still needs to know what all the questions are and has to add the answers to the answer file for each computer on which the unattended install is to be performed. As minor changes in hardware between the computers can result in different questions by the installation program and thus different answers in the answer file, the user often times must manually alter the answer file to accommodate each specific computer on which the unattended install is to be performed.

The automated system setup described herein solves these and other problems.

SUMMARY

Automated system setup is described herein.

According to one aspect, a pre-execution environment on a computing device is started and configuration information for an operating system of the computing device is retrieved based on an identifier of the computing device. The operating system is installed on the computing device using the configuration information.

According to another aspect, execution of an installed operating system on a computing device is begun, and custom software configuration information for the computing device is retrieved based on a unique identifier of the computing device. The custom software is installed on the computing device using the custom software configuration information.

According to yet another aspect, a mapping of network interface card (NIC) identifiers to ports of the network switch is retrieved from a network switch. For one or more of the network interface card (NIC) identifiers, a type of network the corresponding network interface card (NIC) is to be on is identified. Switch configuration information based on the mappings and the identified network types is generated, and the switch configuration information is written to the network switch.

According to still another aspect, the various information regarding the computing device as well as the installed operating system and application software is maintained for asset tracking purposes.

BRIEF DESCRIPTION OF THE DRAWINGS

The same numbers are used throughout the document to reference like components and/or features.

DETAILED DESCRIPTION

Automated system setup is described herein. The automated system setup includes automated configuration of one or more of: an operating system on a computing device(s), custom software on a computing device(s), and configuration information for a network switch(es). The device information can also optionally be maintained for asset tracking purposes.

Figure 1:
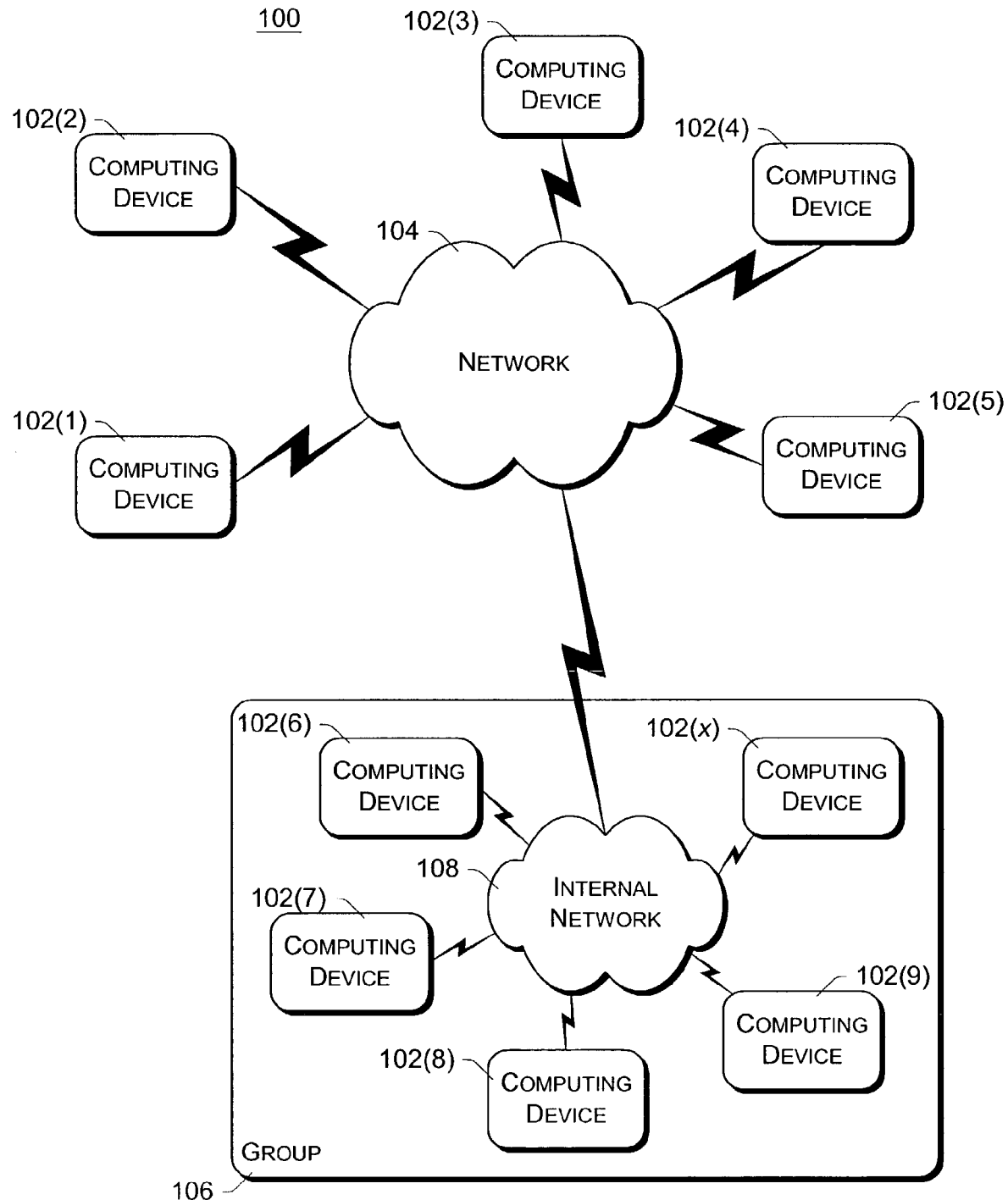
FIG. 1 illustrates an exemplary network environment in which the automated computing system setup can be employed.

FIG. 1 illustrates an exemplary network environment 100 in which the automated computing system setup can be employed. In environment 100, multiple (x) computing devices 102(1), 102(2), . . . , 102(x) are coupled to communicate with one another via a network 104 and/or a network 108. Network 104 and network 108 are each intended to represent any of a variety of conventional network topologies and types (including wired and/or wireless networks), employing any of a variety of conventional network protocols (including public and/or proprietary protocols). Each of network 104 and network 108 may include, for example, the Internet as well as possibly at least portions of one or more local area networks (LANs) and/or wide area networks (WANs).

Group 106 represents any of a variety of different computing device groupings, such as a home computer LAN, a corporate LAN or WAN, a datacenter, a server cluster, and so forth. Network 108 can be coupled to network 104 in a variety of different manners, such as via one or more computing devices 102, via various networking devices (e.g., routers, bridges, etc.), and so forth.

Computing devices 102 can each be any of a variety of conventional computing devices, including desktop PCs, notebook or portable computers, workstations, mainframe computers, Internet appliances, gaming consoles, handheld PCs, cellular telephones, personal digital assistants (PDAs), combinations thereof, etc.

Figure 2:
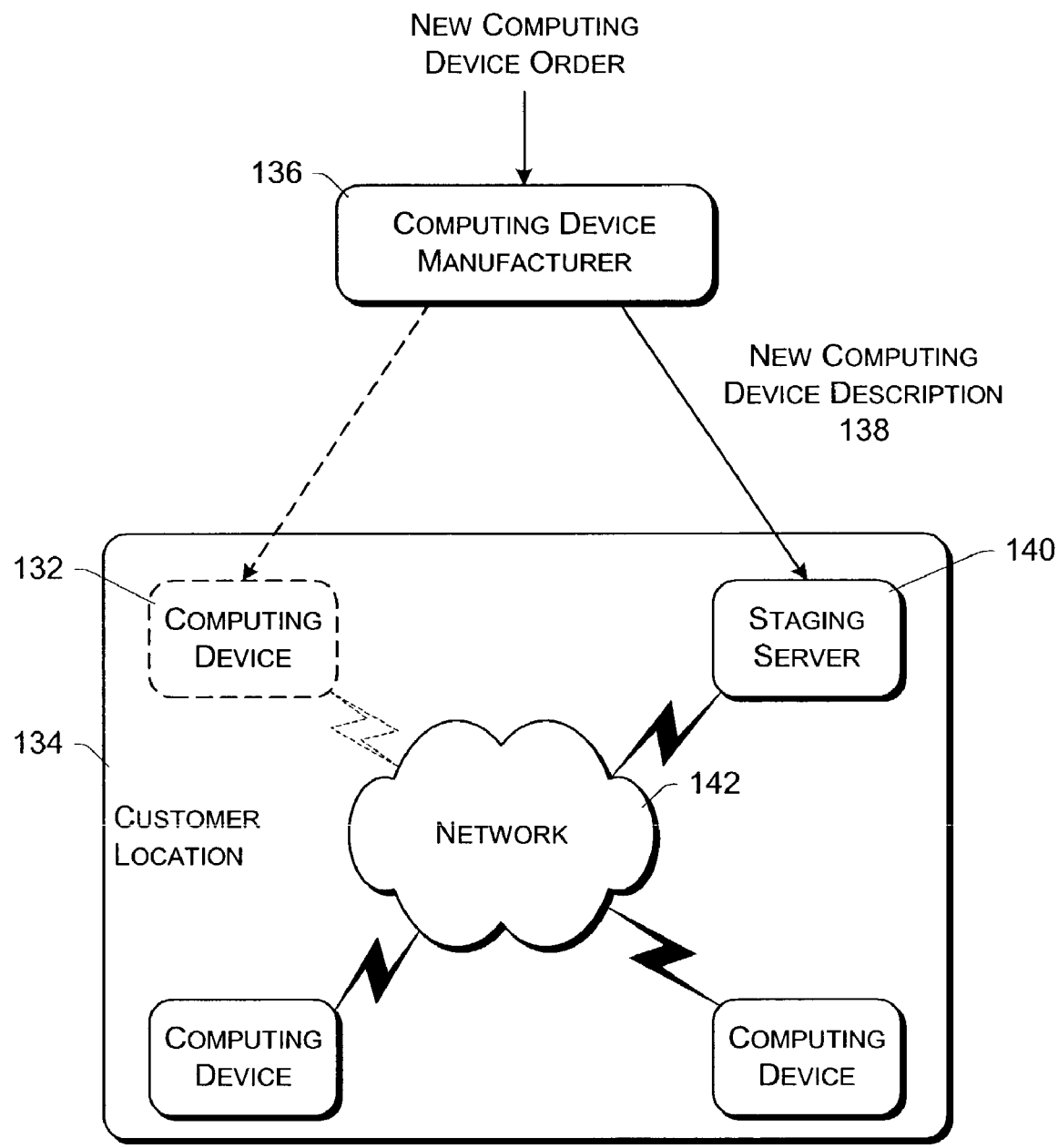
FIG. 2 is a block diagram illustrating an example of automated system setup.

FIG. 2 is a block diagram illustrating an example of automated system setup. In the example of FIG. 2, a new computing device 132 is to be added to a customer location 134. Customer location 134 can be, for example, a group 106 of FIG. 1. Customer location 134 may be a geographically close facility (e.g., a particular building) or alternatively may be widespread (e.g., throughout a city, state, country, world, and so forth).

An order for a new computing device is received at the computing device manufacturer 136, which builds the device as desired (or alternatively selects a pre-built device) and sends the device to customer location 134. It should be noted that one or more additional parties may be involved in the transfer between manufacturer 136 and customer location 134, such as a device reseller or distributor, a shipping company (or companies), and so forth.

Manufacturer 136 also sends information 138 describing the new computing device to a staging server 140 at customer location 134 (this can be a manual process in which someone at customer location 134 receives the information and manually enters it into staging server 140, or it may be automated with no human involvement). The new computing device description information 138 includes at least an identifier of the new computing device. This identifier may uniquely identify the computing device globally, or alternatively uniquely identify the computing device locally (e.g., within customer location 134). This identifier may take a variety of different forms, such as a network interface card (NIC) Media Access Control (MAC) address, a network card globally unique id (GUID), a serial number, an asset tag number, a CPU ID, combinations thereof, and so forth. Additional information may also be included as part of the description information 138, such as hardware and/or software characteristics of the computing device (e.g., versions of hardware and/or software, an amount and/or type of memory (e.g., Random Access Memory (RAM)) in the device, a type and/or speed of processor in the device, an amount and/or size of hard drives in the device, and so forth), asset tracking information, date and/or time the device was built, date and/or time the device was shipped, serial number, service tag number, purchase order number, promised shipping date, model name and/or number, NIC MAC addresses, warranty type and/or duration, intended role or functionality of the device, location where the device is to be shipped and/or used, and so forth.

It should be noted that some computing devices may have multiple network interface cards. In such situations, where the computing device identifier is based on the network interface card (e.g., its MAC address), there can be multiple identifiers for the computing device. Alternatively, a selection may be made of one or more of these multiple cards to determine the identifier. For example, the MAC addresses of the multiple cards may be combined (e.g., concatenated together), or one of the network interface cards may be selected as the one that will be used as the basis for the identifier (e.g., one may be selected randomly, one may have been designated as the primary card and the other(s) as secondary or backup card(s), only one may have a memory device with pre-execution instructions embedded therein and it is the one selected as the basis for the identifier, etc.). By way of another example, each of the multiple network interface cards may be destined to be coupled to a different network, with only one to be coupled to the same network as staging server 140 (e.g., network 142 of FIG. 2 or network 108 of FIG. 1), and the identifier of that card is the identifier used as the computing device identifier.

In an exemplary implementation, the computing device description information 138 is communicated to staging server 140 prior to delivery of the computing device 132 to customer location 134. Alternatively, the computing device description information 138 may be communicated to staging server 140 concurrent with, or subsequent to, delivery of the computing device 132 to customer location 134.

The received computing device description information 138 is associated with a particular type of device in staging server 140. Each computing device at customer location 134 is assigned to provide particular functionality, and thus is assigned to be a particular type of device. The exact nature of this functionality can vary based on the purchaser's desires and the nature of customer location 134. In one exemplary implementation, customer location 134 comprises a datacenter designed to provide online gaming services to gaming consoles. Different types of functionality can be provided by the computing devices of the data center, such as security gateway devices functioning to shield the remaining computing devices in the datacenter from the Internet, presence and notification devices functioning to allow friends to be notified when one another are logged on to the system, statistics devices functioning to maintain leader boards and/or other statistics for online games, matchmaking devices functioning to allow users to find other users to play games with, and so forth.

The assigning of new computing device 132 to be a particular type of device can be performed manually. For example, a system administrator at customer location 134 may enter, into staging server 140, an assignment of the particular computing device to a particular type of device (e.g., by entering a name or identifier of the type in a database entry corresponding to new computing device 132). Alternatively, the type of device may be entered into staging server 140 first and new computing device 132 subsequently assigned to that type, as discussed in more detail below. In yet another alternative, this assignment may be performed automatically. For example, a system administrator at customer location 134 may enter, into staging server 140, an indication that three devices of one type are needed and four devices of another type are needed, and staging server 140 can automatically assign new devices (e.g., randomly, alternating types, in accordance with some predetermined or administrator-identified criteria, etc.) to these two types. By way of yet another example, a system administrator at customer location 134 may enter into staging server 140 a set of one or more rules to be used in adding new devices to customer location 134, and staging server 140 can follow these rules when new computing device 132 is received (e.g., the rule may indicate to keep a ratio of devices of one type to devices of another type of 3:1, and when a new device is received staging server 140 can assign it to be whichever of the two devices keeps this ratio as close as possible to 3:1).

When computing device 132 is added to customer location 134, it is automatically set up for operation at customer location 134. This automated setup can include automatic installation of an operating system on computing device 132 and/or automatic installation of application programs on computing device 132 that allow computing device 132 to carry out its intended functionality.

Computing device 132 is typically received from manufacturer 136 without an operating system installed on it. Thus, computing device 132 is initially started or booted into a pre-execution environment. The pre-execution environment includes sufficient instructions to allow computing device 132 to access staging server 140 via network 142 and obtain operating system configuration information from server 140. The instructions included to allow computing device 132 to access staging server 140 can vary based on how the operating system configuration information is stored in server 140. In one implementation, staging server 140 stores information, including the operating system configuration information, in a SQL database, and thus the instructions in the pre-execution environment allow computing device 132 to access a SQL database. The instructions in the pre-execution environment further include sufficient instructions to allow computing device 132 to retrieve and run an installation program to install the operating system based on the received operating system configuration information. In one exemplary implementation, the pre-execution environment is a Windows® PE operating system, which is part of the Windows® XP operating system OEM preinstall kit (additional information regarding the Windows® PE operating system and the Windows® XP operating system OEM preinstall kit is available from Microsoft® Corporation of Redmond, Wash.). Alternatively, the pre-execution environment may be other public or proprietary systems, such as Intel PXE.

The pre-execution environment is started by executing instructions obtained by the computing device from a disk (e.g., magnetic or optical) inserted into a disk drive of computing device 132 or alternatively pre-installed by manufacturer 136 on a hard drive of device 132. Alternatively, the pre-execution environment may be started by executing instructions obtained from other components or locations. For example, a network interface card (NIC) of computing device 132 may have a memory device (e.g., a Flash memory) with the instructions embedded therein. By way of another example, when device 132 is powered-on without any operating system running, the NIC may advertise itself on network 142 as needing an address. Staging server 140, also on network 142, detects this advertising and checks whether it has a listing for the computing device identifier. If staging server 140 has a listing for the computing device identifier, then staging server 140 transmits the instructions for the pre-execution environment to computing device 132. In this example, the NIC includes sufficient instructions to allow it to communicate with the staging server 140 and receive the instructions for the pre-execution environment.

The instructions for the pre-execution environment may be software instructions or firmware instructions, or combinations thereof. In one implementation, the instructions are in a scripting language, such as written in the Visual Basic® development system, Practical Extraction Report Language (PERL), Java Script (JScript), etc. Additionally, the pre-execution environment may alternatively be implemented in hardware, such as a programmable logic device (PLD) or Application Specific Integrated Circuit (ASIC).

Figure 3:
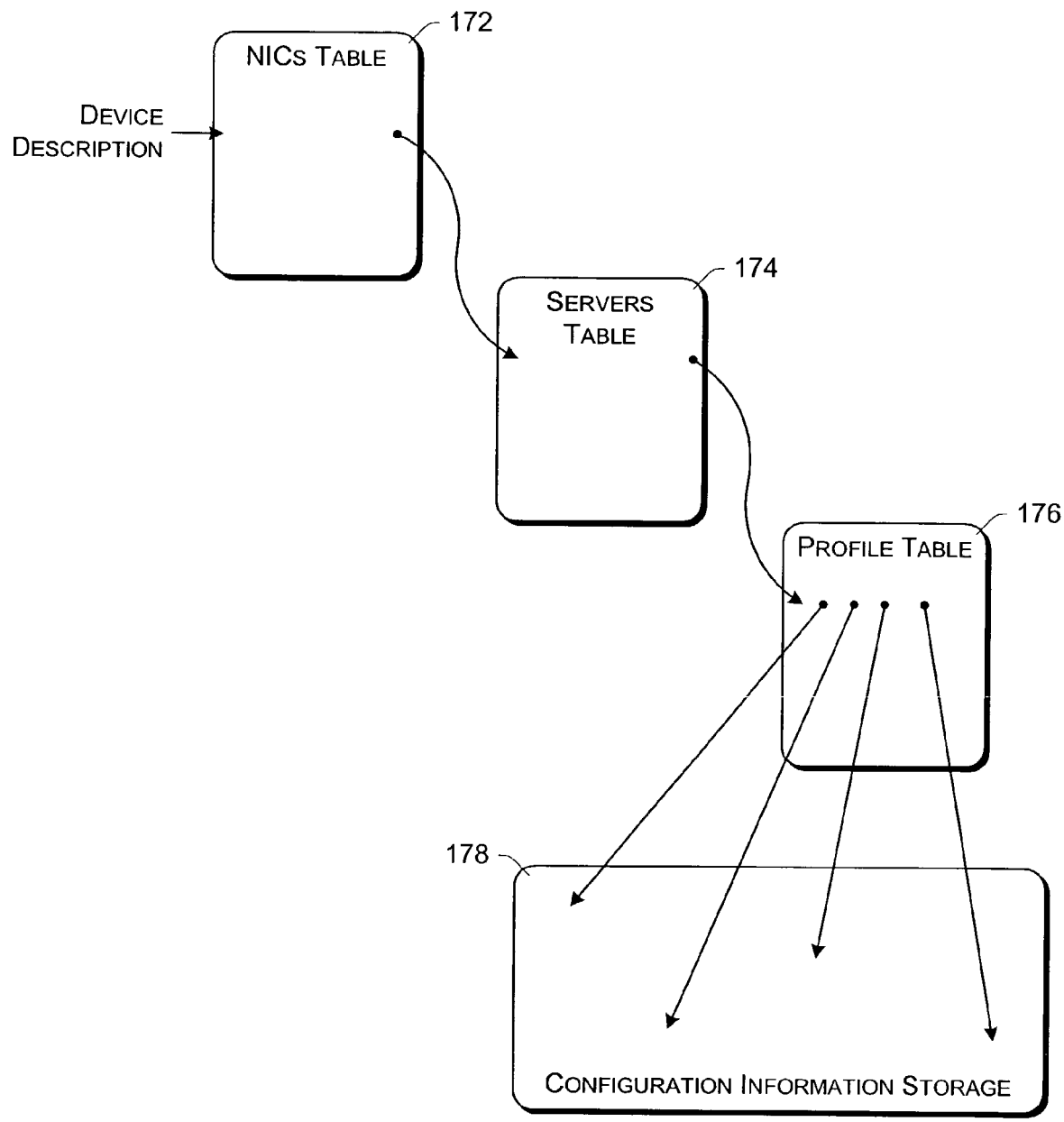
FIG. 3 illustrates an exemplary set of tables used by staging server in providing the appropriate configuration information to a computing device.

FIG. 3 illustrates an exemplary set of tables used by staging server 140 in providing the appropriate configuration information to computing device 132. Staging server 140 maintains a NICs table 172, a servers table 174, and a profile table 176. These tables 172, 174, and 176 are also referred to collectively as the device database, as they maintain various information regarding the devices (e.g., the devices at customer location 134 of FIG. 2). Staging server 140 further includes a configuration information storage 178. The device database may be implemented using any of a variety of conventional databases, including relational and non-relational (e.g., flat-file) databases. Examples of such databases include a SQL database, a Microsoft® Access database, any of a variety of databases available from Oracle® Corporation, any of a variety of the Informix® product family available from IBM® Corporation, any of a variety of databases available from Sybase® Inc., etc. Alternatively, the device database may be implemented in other manners, such as using a conventional spreadsheet program (e.g., Microsoft® Excel), word processing or plain text files (e.g., as generated using a Microsoft® Word word processing program or any other conventional word processing or text editing or text input program), and so forth.

It should be noted that tables 172, 174, and 176 represent the logical grouping of data that describes NICs, servers and profiles, and that specific implementations may choose to distribute the information in these logical groups into more (or fewer) tables than are shown in FIG. 3. For example, the data may be stored in a single table, or alternatively in hundreds of tables.

NICs table 172 is a mapping of computing device identifiers to device names. The computing device identifiers, as well as any other computing device description information received from the manufacturer (description 138 of FIG. 2) is added to NICs table 172 upon receipt at staging server 140. The name to be assigned to the computing device is then added to NICs table 172, creating a correspondence between the computing device identifier and the name assigned to the computing device. The computing device name can be entered manually (e.g., by a system administrator at staging server 140) or alternatively automatically (e.g., by staging server 140 or alternatively another device at customer location 134 of FIG. 2). For example, staging server 140 may be configured with a set of one or more rules describing how devices are to be named (e.g., beginning with a fixed set of characters followed by a number that is assigned in order by staging server 140).

In another implementation, each entry in NICs table 172 is an entry for a particular NIC of a computing device, and in situations where a computing device has multiple NICs then there are multiple entries in table 172 for each NIC identifier. Each of the multiple entries for a computing device include some of the same information (e.g., the name assigned to the computing device), and some different information (e.g., the network on the identified NIC is to be on (e.g., network 104 or network 108 of FIG. 1)).

Servers table 174 is a mapping of computing device names to profile identifiers. Each computing device name entered into NICs table 172 is also entered into servers table 174 and associated with one of multiple profiles. A different profile is used for each type of device that may be automatically set up for use at customer location 134 of FIG. 2. Multiple different server names can be associated with the same profile. The profile identifier identifies a record in profile table 176, which identifies the configuration information for that type of device.

The configuration information for a type of device includes the various software components and/or modules from storage 178 that are to be installed on the computing device for the operating system, as well as certain information to configure the operating system (e.g., how to partition hard drives, how to configure a display adapter, how to configure a network connection, etc.). These components and/or modules include, for example, the core components of the operating system, additional non-core components of the operating system, patches or fixes for the operating system, etc The configuration information can also include some computing device-specific information from NICs table 172 (such as a network address to be assigned, the computer name, a domain name to be assigned, etc.). Such computing device-specific information could be included in table 172 by manufacturer 136 of FIG. 2, by a system administrator's manual input (e.g., from staging server 140), by automatic input from some other device (e.g., staging server or some other device at customer location 134), and so forth.

The lookups in tables 172, 174, and 176 may be performed under the control of staging server 140 or alternatively the computing device being setup (e.g., new computing device 132). For example, staging server 140 may receive the computing device identifier from device 132 and perform a lookup on table 172 based on the computing device identifier, then do a lookup on table 174 based on the name obtained from table 172, and then do a lookup on table 176 based on the profile identifier obtained from table 174. Alternatively, device 132 can do a lookup on table 172 (e.g., via staging server 140) and obtain the name. Device 132 can then do a lookup on table 174 (e.g., via staging server 140) using the obtained name in order to obtain the profile identifier. Device 132 can then do a lookup on table 176 (e.g., via staging server 140) using the obtained profile identifier in order to obtain the configuration information.

Additionally, application programs may also be automatically setup on new computing device 132. If such application programs are to be automatically setup (also referred to as automated custom software configuration), then the configuration information for a type of device further includes the various software components and/or modules that are to be installed on the computing device in order for the device to carry out its intended functionality. These include the application program(s) or software to be installed on the device. For example, if a device is to provide statistics services for online gaming, then the profile for that device would identify the necessary software components and configuration information to be installed on the device in order for the device to implement the statistics services.

In some embodiments the operating system is automatically installed on a computing device and the software automatically configured on the device. Alternatively, only the operating system may be automatically installed on the computing device (and the custom software configuration not automated), or only the software may be automatically configured on the device (and the operating system installation not automated). In one implementation, if the custom software configuration is not automated, then the computing device advertises itself as being ready for custom software configuration after the operating system is installed. This advertising can occur in a variety of different manners, such as by writing an indication of its readiness to a log file in staging server 140 or elsewhere (e.g., the indication may simply be the device identifier).

In one implementation, the tables 172, 174, and 176, as well as the configuration information storage 178, are all included on the same server (e.g., staging server 140 of FIG. 2). Alternatively, the tables and/or configuration information may be spread over multiple servers. For example, different parts of the configuration information may be stored on different server devices, configuration information for different types of devices may be stored on different server devices, tables may be split across multiple server devices, and so forth.

Once all of the configuration information is received from staging server 140, the pre-execution environment running on computing device 132 installs the appropriate software components, as identified in the configuration information from the staging server. This is an automated operating system installation process, and in one implementation, the pre-execution environment includes an unattended install process that allows an answer file to be used during the installation process. The pre-execution environment automatically generates the answer file based on the configuration information received from staging server 140. The pre-execution environment knows (e.g., is programmed with) the format of the answer file, and thus knows how to generate the answer file (e.g., what data is to be included in the answer file, how it is to be formatted, etc.). Alternatively, the staging server 140 may generate the answer file. In one implementation, the unattended install process is a Microsoft® Windows® operating system unattended install process—additional information on this unattended install process is available from Microsoft® Corporation of Redmond, Wash.

It should be noted that, during the setup process, the computing device may be restarted or rebooted one or more times by the installation process. This may occur during the installation of the operating system, between installation of the operating system and the application program(s), during installation of the application program(s), after installation of the application program(s), or combinations thereof. When such restarting or rebooting occurs, the installation process continues where it left off prior to restarting or rebooting the device (and may result in launching of the pre-execution environment, another operating system setup program, the operating system itself (possibly in a "startup" mode), etc.). Once the installation process is complete, the operating system executes rather than the pre-execution environment (optionally, the last act performed by the installation process may be to restart or reboot the computer into its operating system).

Thus, it can be seen that a different profile can be established for each different type of device that is to be included in, and automatically set up in, customer location 134. Multiple different computing devices can be associated with the same profile, with most of the configuration information being made available from the configuration information store 178. Differences between computing devices of the same types (e.g., their network addresses) are identified in NICs table 172 and the appropriate information (e.g., their network addresses) retrieved therefrom during the setup process. Whenever a change needs to be made to the configuration information for a particular device (e.g., an upgrade to components in the operating system), the change need simply be made to the appropriate component(s) in storage 178 in order to be propagated to all subsequent installations. Similarly, if new computing devices may include new hardware (e.g., different video cards, different hardware versions of video card, different versions or sizes of hard drives, etc.), the appropriate drivers for this new hardware need simply be added to storage 178, a new profile created (or the previous profile updated) in profile table 176, and all subsequent installations can make use of the new drivers.

In an alternate implementation, rather than having the computing device identifier added to NICs table 172 of staging server 140 by manufacturer 136 of FIG. 2, the computing device identifier may be added when staging server 140 is initially accessed by computing device 132 (running the pre-execution environment). Computing device 132 is able to provide information it knows about itself (in particular, its unique identifier) to staging server 140. Staging server 140 can enter this information into a new entry in table 172, and have the remaining information in the entry populated in the same manner as discussed above (e.g., manually by a system administrator, automatically by server 140 or another device, etc.).

In another alternate implementation, the computing device identifier may be added to NICs table 172 of staging server 140 by a user (e.g., system administrator) at staging server 140. A user interface is provided to the user of staging server 140 that allows the user to input information about the computing device (e.g., its identifier, type, network information (e.g., network addresses, gateways, etc.). This information is entered into a new entry in table 172, and the remaining information in the entry can be populated in the same manner as discussed above (e.g., manually by a system administrator, automatically by server 140 or another device, etc.).

In addition to initially installing an operating system onto computing device 132, the automated setup process can also be used install an operating system on a device that has previously had an operating system installed thereon. This situation can arise, for example, where changes have been made to the operating system (e.g., new features or bug fixes) and these changes are to be incorporated into the device (sometimes referred to as rebuilding the device), or where the manufacturer 136 of FIG. 2 has pre-installed an operating system on the device and the customer desires to change the operating system.

When installing an operating system on a device that already has an operating system installed thereon, the automated installation process is initiated. The automated installation process can be initiated in different manners, such as by invoking a particular command, selecting an appropriate key sequence, inserting a bootable disk that includes the pre-execution environment instructions, etc. Once initiated, the automated installation process executes as discussed above, loading the appropriate configuration information from staging server 140 and installing the operating system based on the configuration information. Any of the previous operating system is ignored by the installation process, and overwritten if necessary. In one implementation, the hard drive of the computing device may be formatted and/or partitioned prior to (or as part of) the automated installation process.

Figure 4:
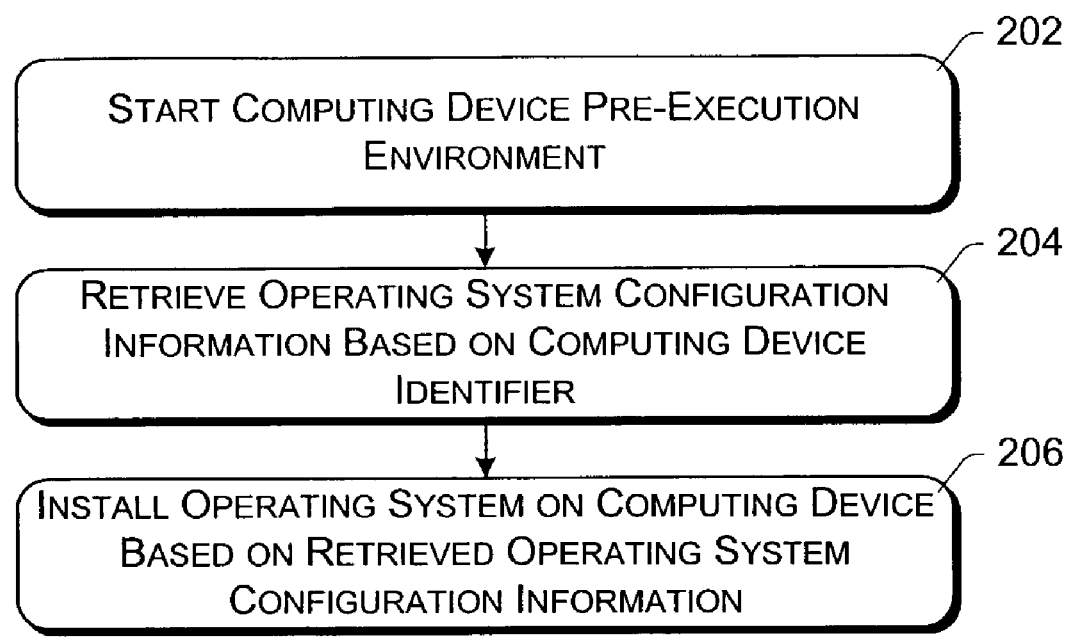
FIG. 4 is a flowchart illustrating an exemplary process for automated operating system installation on a computing device.

FIG. 4 is a flowchart illustrating an exemplary process 200 for automated operating system installation on a computing device. Process 200 is implemented by a client device, such as device 132 of FIG. 2, and may be performed in software, firmware, hardware, or combinations thereof.

Initially, the computing device pre-execution environment is started (act 202). Operating system configuration information is then retrieved based on the computing device identifier (act 204). The operating system is then installed on the computing device based on the retrieved operating system configuration information (act 206).

Figure 5:
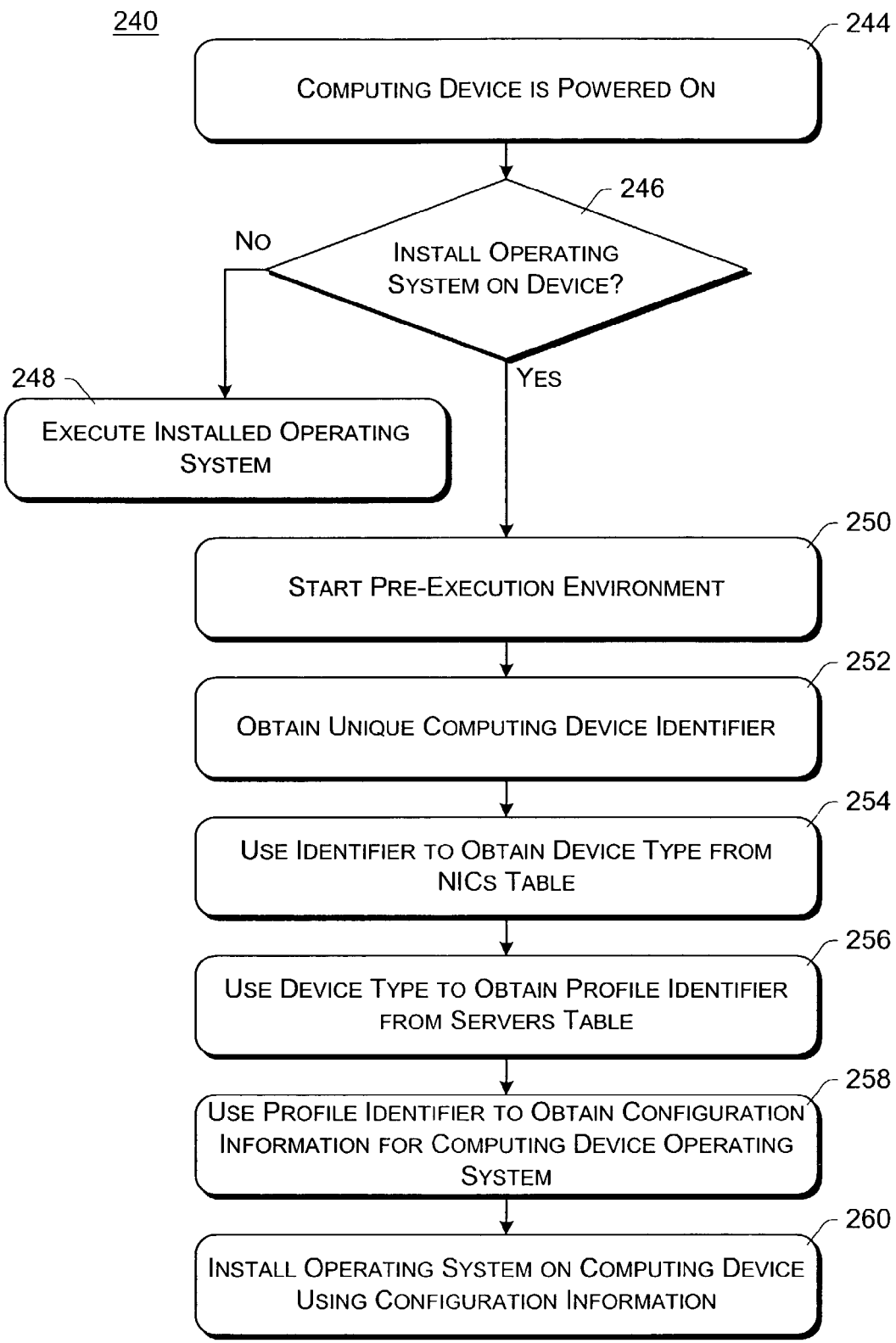
FIG. 5 is a flowchart illustrating a more detailed exemplary process for automated operating system installation on a computing device.

FIG. 5 is a flowchart illustrating a more detailed exemplary process 240 for automated operating system installation on a computing device. Process 240 is implemented by a computing device, such as device 132 of FIG. 2, and may be performed in software, firmware, hardware, or combinations thereof.

Initially, the computing device is powered on (act 244) and a determination made as to whether an operating system is to be installed on the device (act 246). If there is no operating system already installed on the device, then the determination is made in act 246 that an operating system is to be installed on the device. If an operating system is already installed on the device, then the determination is made in act 246 that an operating system is to be installed on the device if a request or command to install a new operating system is received. Such a request or command may also be received after the device has been powered on for a period of time (which may be on the order of days or weeks or longer), at which point process 240 returns to act 246 and determines that an operating system is to be installed on the device.

If an operating system is not to be installed on the device, then the device executes its installed operating system (act 248). However, if an operating system is to be installed on the device, then the device starts a pre-execution environment (act 250). A unique identifier of the computing device is obtained (act 252) and in turn is used to obtain the type of the device from a network interface cards (NICs) table (act 254). The device type is then used to obtain a profile identifier from a servers table (act 256) and the profile identifier is used to obtain configuration information for the operating system to be installed on the computing device (act 258). The operating system is then installed on the computing device using the obtained configuration information (act 260).

Returning to FIG. 2, application program configuration information can also be maintained by staging server 140. This application program configuration information allows a computing device to be automatically customized with particular software in order to carry out its intended functionality. The configuration information for a particular computing device type can be identified in its corresponding profile identifier in profile table 176 of FIG. 3, and the configuration information itself stored in storage 178 of FIG. 3.

The automated custom software configuration of the computing device may be done immediately after the operating system is automatically installed on the computing device. Alternatively, the automated custom software configuration of the computing device may be done at a later time. It is also to be appreciated that the automated custom software configuration of the computing device may be done regardless of how the operating system is installed on the computing device (e.g., the operating system may be automatically installed as discussed above, or alternatively installed in some other manner).

Figure 6:
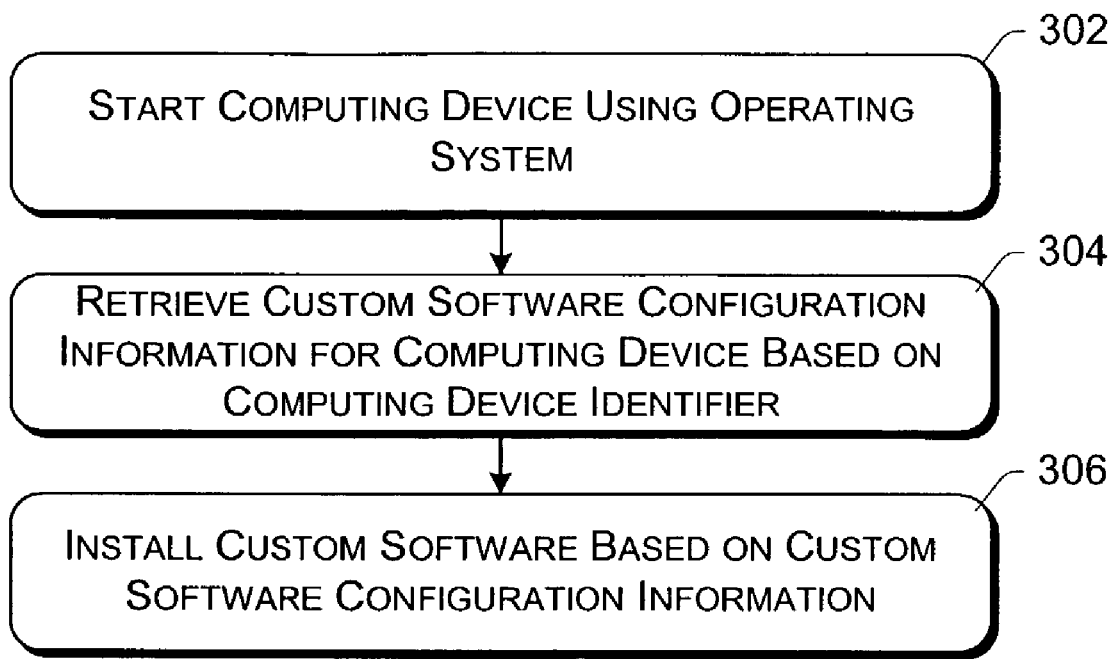
FIG. 6 is a flowchart illustrating an exemplary process for automated application software installation on a computing device.

FIG. 6 is a flowchart illustrating an exemplary process 300 for automated application software installation on a computing device. Process 300 is implemented by a computing device, such as device 132 of FIG. 2, and may be performed in software, firmware, hardware, or combinations thereof.

Initially, the computing device operating system is started (act 302). Custom software configuration information for the computing devices is then retrieved based on a computing device identifier (act 304). The custom software is then installed on the computing device based on the retrieved custom software configuration information (act 306).

Figure 7:
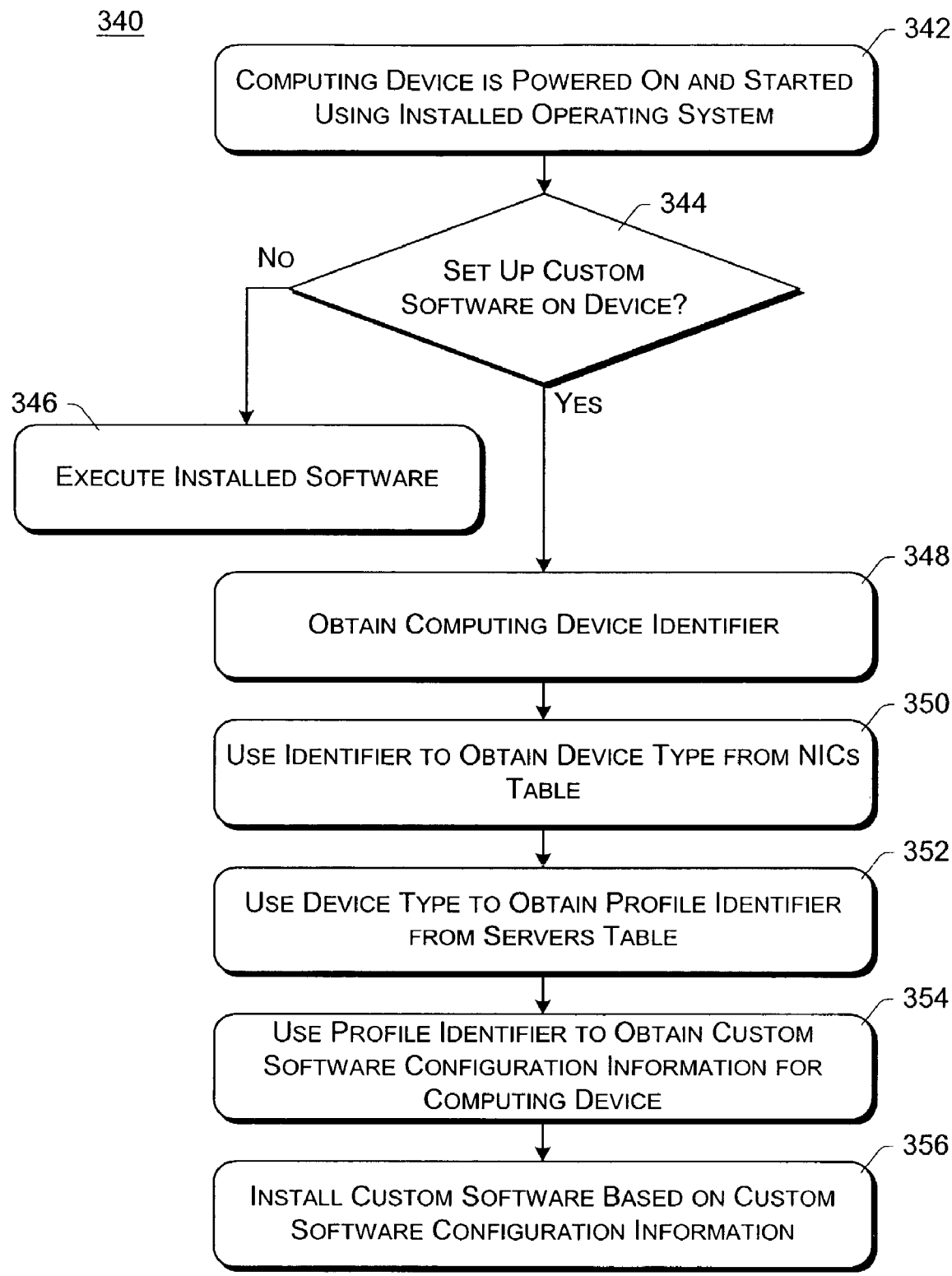
FIG. 7 is a flowchart illustrating a more detailed exemplary process for automated application software installation on a computing device.

FIG. 7 is a flowchart illustrating a more detailed exemplary process 340 for automated application software installation on a computing device. Process 340 is implemented by a computing device, such as device 132 of FIG. 2, and may be performed in software, firmware, hardware, or combinations thereof.

Initially, the computing device is powered on and started or booted using its installed operating system (act 342). A determination is then made as to whether custom software is to be installed on the device (act 344). The determination is made in act 344 that custom software is to be installed on the device if a request or command to install the custom software is received. Such a request or command may be received immediately after the operating system has been installed on the computing device (e.g., the request issued as part of an overall automated setup process for the computing device) or alternatively after the device has been powered on for a period of time (which may be on the order of days or weeks or longer), at which point process 340 returns to act 344 and determines that custom software is to be installed on the device.

If custom software is not to be installed on the device, then the device executes its installed software (act 346). However, if custom software is to be installed on the device, then a unique identifier of the computing device is obtained (act 348) and is used to obtain the type for the device from a network interface cards (NICs) table (act 350). The device type is then used to obtain a profile identifier from a servers table (act 352) and the profile identifier is used to obtain configuration information for the custom software to be installed on the computing device (act 354). The operating system is then installed on the computing device using the obtained configuration information (act 356).

Additionally, various modifications can be made to the operating system and/or custom software installed on the computing device after it is installed. Such modifications may be, for example, service packs that add features to the operating system and/or custom software, bug or other error fixes, security fixes, and so forth. Staging server 140 maintains the configuration information of the various computing devices, allowing which modifications are to be made to which computing devices to be readily determined (e.g., which computing devices need a new software module to fix a security flaw). The configuration information further allows a determination of any customization of the modifications (e.g., based on processor type, operating system version, etc.) to be readily determined. Using this configuration information, then, the correct modifications can be made to the operating system and/or custom software (e.g., the correct modification files selected and installed).

In one implementation, the device database is made up of multiple data structures that include the tables illustrated in FIG. 3 above as well as other tables. These structures are described herein in terms of tables with fields, although the structures may be implemented in different manners. Various data is included in these structures, as indicated in Tables I-XXVIII below.

Table I is a datacenters table that includes entries identifying datacenters (e.g., multiple groups 106 of FIG. 1 or customer locations 134 of FIG. 2).

TABLE I

| Field | Description |
| --- | --- |
| DataCenterId | Unique (globally or locally) identifier of the datacenter. |
| Name | Name of the datacenter. |
| Owner | Owner of the datacenter. |
| Address | Address (location) of the datacenter. |
| ContactInformation | Information describing how to contact the owner and/or administrator of the datacenter. |

Table II is a networks table that includes entries describing particular networks in a datacenter and can include multiple entries for each datacenter.

TABLE II

| Field | Description |
| --- | --- |
| NetworkId | Unique (globally or locally) identifier of the network. |
| DataCenter | Identifier of a datacenter that the network is part of. |
| OsSource | Network file share containing operating system (OS) installation files. |
| OsDrive | Drive letter where operating system (OS) will be installed. |
| Domain | Domain of the network. |
| Name | Friendly name of the network. |
| Comment | Comments or remarks regarding the network. |

Table III is a VLAN table that describes a virtual LAN (VLAN) on a network in a datacenter.

TABLE III

| Field | Description |
| --- | --- |
| VlanID | Unique (globally or locally) identifier of the VLAN. |
| Network | Identifier of the network the VLAN is on. |
| VlanNumber | Identifier by which the switch identifies the VLAN. |
| CSMVlanNumber | Identifier by which the Context Switching Module (CSM) in the switch identifies the VLAN. |
| ISubnetDottedIp | IP subnet associated with the VLAN. |
| Name | Friendly name of the VLAN. |
| Usage | Description of the purpose/use for the VLAN. |
| Switch | Switch ID identifying a physical switch represented in the Switches table. |
| ServerTier | ID value identifying which tier (Front/Middle/Back) of the network the VLAN is associated with. |
| INetworkAddressDottedIp | IP address (maskable portion) of the VLAN. |
| ISubnet | ID value identifying the subnet mask associated with the VLAN. |

Table IV is a NICs table (e.g., table 172 of FIG. 3) includes entries regarding particular computing devices and associating computing devices with server names.

TABLE IV

| Field | Description |
| --- | --- |
| NicID | Unique (globally or locally) identifier of the NIC. |
| Switch | Identifier of the switch the NIC is coupled to. |

TABLE IV-continued

| Field | Description |
| --- | --- |
| SwitchBlade | Identifier of the blade (designed to plug into a network switch to provide network ports) on the switch that the NIC is coupled to. |
| SwitchPort | Identifier of the port on the blade on the switch that the NIC is coupled to. |
| PatchPanelNumber | Identifier of the patch panel that the NIC is plugged in to. |
| PatchPanelRow | Identifier of the row of the patch panel that the NIC is plugged in to. |
| PatchPanelPort | Identifier of the port of the patch panel that the NIC is plugged in to. |
| Vlan | Identifier of the VLAN that the NIC is on. |
| Server | Identifier of a server name corresponding to the NIC (and thus the computing device). |
| NicCard | Identifier of the name of the NIC. |
| NicType | Identifier of the type of NIC. |
| Name | Specifies the text description of the NIC that will be visible in the operating system user interface (e.g., "Internet Facing 123.45.67.x"). |
| IMAC | Specifies the Media Access Control layer address (MAC address) for the NIC as programmed into the card by the card manufacturer. |
| IDottedIp | IP address of the NIC. |
| ISubnetIp | Identifier of IP subnet address of the NIC. |
| IGatewayIp | Identifier of IP gateway address of the NIC. |
| PrimaryDNS | Identifier of the primary Domain Name System (DNS) server for the NIC. |
| SecondaryDNS | Identifier of the secondary Domain Name System (DNS) server for the NIC. |
| DHCP | Identifier (e.g., address) of the Dynamic Host Configuration Protocol (DHCP) server for the NIC. |
| WINS | Identifier (e.g., address) of the Windows Internet Naming Service (WINS) server for the NIC. |
| Netbios | NetBIOS identifier of the NIC. |
| MSClient | Specifies whether the operating system should enable the Client for Microsoft Networking service on this NIC. |
| MSServer | Specifies whether the operating system should enable the File and Printer Sharing for Microsoft Networks service on the NIC. |

Table V is a NIC cards table that includes entries associating a NIC identifier (e.g., MAC address) with a common name.

TABLE V

| Field | Description |
| --- | --- |
| NicCardId | Unique (globally or locally) identifier of the NIC. |
| NicName | Friendly name of the NIC. |

Table VI is a NIC types table that includes entries associating NICs with various settings.

TABLE VI

| Field | Description |
| --- | --- |
| NicTypeId | Unique (globally or locally) identifier of the type of the NIC. |
| Name | Friendly name of the type of the NIC. |
| SettingsScript | Script to be executed to install the appropriate software components and/or modules for supporting this type of NIC. |

Table VII is a Subnet IPs table that includes entries identifying subnet IP (Internet Protocol) addresses used by a NIC.

TABLE VII

| Field | Description |
| --- | --- |
| SubnetIpId | Unique (globally or locally) identifier of the subnet IP address. |
| ISubnetDottedIp | IP subnet address. |

Table VIII is a Gateway IPs table that includes entries identifying gateway IP addresses used by a NIC.

TABLE VIII

| Field | Description |
| --- | --- |
| GatewayIpId | Unique (globally or locally) identifier of the gateway IP address. |
| IGatewayDottedIp | IP gateway address. |

Table IX is a DNS servers table that includes entries identifying address of DNS servers used by a NIC.

TABLE IX

| Field | Description |
| --- | --- |
| DnsServersId | Unique (globally or locally) identifier of the DNS server. |
| Name | Name of the DNS server. |
| IDottedIp | IP address of the DNS server. |

Table X is a servers table (e.g., table 174 of FIG. 3) that includes entries mapping device names to profiles.

TABLE X

| Field | Description |
| --- | --- |
| ServerId | Unique (globally or locally) identifier of the device (e.g., the device name). |
| Rack | Identifier of the rack the device is located in. |
| Network | Identifier of the network the device is on. |
| Name | Specifies the name that the device will use on the network once the operating system is installed. |
| ServerUsage | Identifier of friendly name for the functionality of the device. |
| Profile | Identifier of a profile associated with the device type. |
| ForgeLogon | Identifier of logon information for the automated installation processes. |
| ProductKey | Identifier of product keys used during the installation process. |
| AssetTag | Asset tag value for the device. |
| ServerTier | ID value identifying which tier (Front/Middle/Back) of the server the VLAN is associated with. |
| SerialNumber | Serial number of the device. |
| SystemName | Name of model of the device. |
| ProcessorType | Type of processor in the device. |
| ProcessorSpeed | Speed of the processor in the device. |
| AmountRAM | Amount of RAM in the device. |
| HardDriveSize | Size of the hard drive in the device. |
| WarrantyExpiration | Identifier of when the warranty on the device expires. |
| PurchaseOrder | Identifier of the purchase order used to purchase the device. |

Table XI is a server usages table that includes entries identifying friendly names for the functionality of a device (e.g., how the device is to be used).

TABLE XI

| Field | Description |
| --- | --- |
| ServerUsageId | Unique (globally or locally) identifier of the friendly name. |
| Name | Friendly name for the functionality of the device. |

Table XII is a Forge logons table that includes entries identifying logon information. In one implementation, the automated installation processes (whether for operating system installation or custom software installation) log on to the staging server using an identifier and password. The valid identifier and password combinations are maintained in the Forge logons table.

TABLE XII

| Field | Description |
| --- | --- |
| ForgeLogonId | Unique (globally or locally) identifier of the logon id and password. |
| UserName | The logon id. |
| Password | The password. |
| Comment | Comments or remarks regarding the logon id and/or password. |

Table XIII is a Product Keys table that includes entries identifying product keys used during the installation process (e.g., security keys or codes that are entered to authenticate that a valid license has been purchased for the component(s) being installed).

TABLE XIII

| Field | Description |
| --- | --- |
| ProductKeyId | Unique (globally or locally) identifier of the product key id. |
| Name | Name of the product (e.g., the application program and/or components of the program, the operating system and/or components of the operating system). |
| Comments | Comments or remarks regarding the product key or the product. |
| ProductKey | The product key. |

Table XIV is a Server Profiles table (e.g., table 176 of FIG. 3) that includes entries mapping profiles to configuration information.

TABLE XIV

| Field | Description |
| --- | --- |
| ServerProfileId | The profile identifier. |
| Name | Friendly name of the profile. |
| Description | Description of the profile. |
| DiskProfile | Identifier of scripts identifying how to configure a disk drive of computing devices having the profile. |
| Components | Identifier of scripts identifying components and/or modules to install on computing devices having the profile. |
| HardwareProfile | Identifier of scripts identifying how to configure the hardware of computing devices having the profile. |
| PostInstallList | Identifier of scripts identifying scripts to execute at the end of the installation profile for computing devices having the profile. |

Table XV is a Components scripts table that includes entries identifying scripts to be executed as part of the installation process.

TABLE XV

| Field | Description |
| --- | --- |
| ComponentScriptId | Unique (globally or locally) identifier of the component script. |
| Name | Friendly name of the component script. |
| Comment | Comments or remarks regarding the script. |
| Script | Identifier of where the script is stored (e.g., within configuration information storage 178 of FIG. 3). |

Table XVI is a Post Install Lists table that includes entries identifying names of and descriptions of scripts (a list of post install scripts) to be executed at the end of the installation process.

TABLE XVI

| Field | Description |
| --- | --- |
| PostInstallListId | Unique (globally or locally) identifier of the post install list. |
| Name | Friendly name of the post install list. |
| Description | Description of the post install list. |

Table XVII is a Post Install List Lists table that includes entries identifying scripts to be executed at the end of the installation process and the order in which they are to be executed.

TABLE XVII

| Field | Description |
| --- | --- |
| PostInstallListListId | Unique (globally or locally) identifier of a particular script. |
| PostInstallList | Identifier of the post install list that the script is part of. |
| SequenceNumber | Order, relative to the other scripts in the post install list, that the script is to be executed in. |
| PostInstallScript | Identifier of the post install script. |

Table XVIII is a Post Install Scripts list that includes entries identifying the scripts to be installed at the end of the installation process.

TABLE XVIII

| Field | Description |
| --- | --- |
| PostInstallScriptId | Unique (globally or locally) identifier of the script. |
| Name | Friendly name of the script. |
| Comment | Comments or remarks regarding the script. |
| Script | Identifier of where the script is stored (e.g., within configuration information storage 178 of FIG. 3). |

Table XIX is a Disk Profile Scripts table that includes entries identifying disk drive configuration scripts to be executed as part of the installation process.

TABLE XIX

| Field | Description |
| --- | --- |
| DiskProfileId | Unique (globally or locally) identifier of the disk profile. |
| Name | Friendly name of the disk profile. |
| Comment | Comments or remarks regarding the disk profile. |
| PartitioningScript | Identifier of where the script to partition the disk drive is stored (e.g., within configuration information storage 178 of FIG. 3). |

TABLE XIX-continued

| Field | Description |
|---|---|
| FormattingScript | Identifier of where the script to format the disk drive is stored (e.g., within configuration information storage 178 of FIG. 3). |

Table XX is a Hardware Profiles table that includes entries identifying hardware configuration scripts to be executed as part of the installation process.

TABLE XX

| Field | Description |
|---|---|
| HardwareProfileId | Unique (globally or locally) identifier of the hardware profile. |
| Name | Friendly name of the hardware profile. |
| Comment | Comments or remarks regarding the hardware profile. |
| UnattendScript | Specifies instructions/configuration used to enable the operating system to load hardware (e.g., disk) drivers to enable it to begin the operating system installation process. |
| OEMDriverPathScript | Specifies the location of hardware drivers (e.g., disk/network/video/other) that the operating system will load to support the hardware on the machine. |
| OEMFilePathScript | Specifies the location of individual driver directories relative to the path specified in OEMDriverPathScript. |

Table XXI is a Racks table that includes entries identifying racks of devices (e.g., servers and/or network switches) within a datacenter.

TABLE XXI

| Field | Description |
|---|---|
| RackId | Unique (globally or locally) identifier of the rack. |
| DataCenter | Identifier of datacenter the rack is located in. |
| RackNumber | An identification number of the rack. |
| AssetTag | An asset tracking number of the rack. |
| Comments | Comments or remarks regarding the rack. |

Table XXII is a Devices table that includes entries identifying the computing devices in a rack.

TABLE XXII

| Field | Description |
|---|---|
| DeviceId | Unique (globally or locally) identifier of the device. |
| Rack | Identifier of the rack the device is located in. |
| DeviceType | The type of the device. |
| Name | The name of the device. |
| AssetTag | An asset tracking number of the device. |

Table XXIII is a Device IPs table that includes entries identifying the IP addresses of devices in a rack.

TABLE XXIII

| Field | Description |
|---|---|
| DeviceIpId | Unique (globally or locally) identifier of the IP address of the device. |
| Device | Unique (globally or locally) identifier of the device. |
| IDottedIp | IP address of the device. |

Table XXIV is a Device types table that includes entries identifying the type of a particular device in a rack.

TABLE XXIV

| Field | Description |
|---|---|
| DeviceTypeId | Unique (globally or locally) identifier of the device type. |
| Name | Friendly name of the device type. |

Table XXV is a Switches table that includes entries identifying network switches in a rack.

TABLE XXV

| Field | Description |
|---|---|
| SwitchId | Unique (globally or locally) identifier of the switch. |
| Rack | Identifier of the rack the switch is located in. |
| Name | The name of the switch. |
| Comments | Comments or remarks regarding the switch. |
| AssetTag | An asset tracking number of the switch. |

Table XXVI is a Modules table that includes entries identifying modules of a network switch in a rack.

TABLE XXVI

| Field | Description |
|---|---|
| ModuleId | Unique (globally or locally) identifier of the module. |
| Switch | Identifier of the switch the module is in. |
| SlotNumber | A number of a physical port (network jack) in the module. |
| Name | The name of the module. |
| NetworkAccess | A boolean flag indicating whether the slot (jack) is connected and in use. |
| AssetTag | An asset tracking number of the module. |

Table XXVII is a Ports table that includes entries identifying ports of a module of a network switch.

TABLE XXVII

| Field | Description |
|---|---|
| PortId | Unique (globally or locally) identifier of the port. |
| Module | Identifier of the module the port is in. |
| ADottedIp | IP address of the NIC coupled to the port. |
| AMAC | Identifier of the MAC address of the NIC coupled to the port. |
| AVlanNumber | Identifier of the VLAN the port is on. |

Table XXVIII is a Modules IPs table that includes entries identifying the IP addresses of the modules of a switch.

TABLE XXVIII

| Field | Description |
|---|---|
| ModuleIpId | Unique (globally or locally) identifier of the module. |
| Module | Module the IP address is assigned to. |
| IDottedIp | IP address of the module. |

Returning to FIG. 1, various conventional network devices such as network switches, hubs, routers, load balancers, etc. are typically included in internal network 108. A network switch has multiple ports or jacks into which a cable, which is also coupled to a NIC of a computing device, can be connected. The network switch is able to obtain, from each computing device coupled to its ports, an identifier of the NIC currently coupled to that port (e.g., its MAC address). By obtaining the identifier for each NIC coupled to each port of the network switch, the network switch or some process or program designed to configure the network switch can identify (by looking up the identifier the NIC in the database) the type and role of the computing device attached to each port and route data to the appropriate computing device.

In some situations, some of the computing devices 102 can have multiple NICs, one coupling the device to network 104 and the other coupling the device to network 108. Care should be taken in coupling computing devices to network switch ports to ensure that the NICs are coupled to the correct ports of the network switches (e.g., so that the NIC that is supposed to be communicating with network 104 is indeed coupled to a network switch port associated with network 104, and that the NIC that is supposed to be communicating with network 108 is indeed coupled to a network switch port associated with network 108).

In one implementation, network switches in internal network 108 can also be automatically configured, thereby ensuring that the different NICs of the computing devices are coupled to the correct ports. By allowing the network switches to be automatically configured, the individual at group 106 that couples the computing device to the network switch(es) need not be concerned with which port he or she is coupling the device to—whatever port it is coupled to will be automatically configured as needed.

Figure 8:
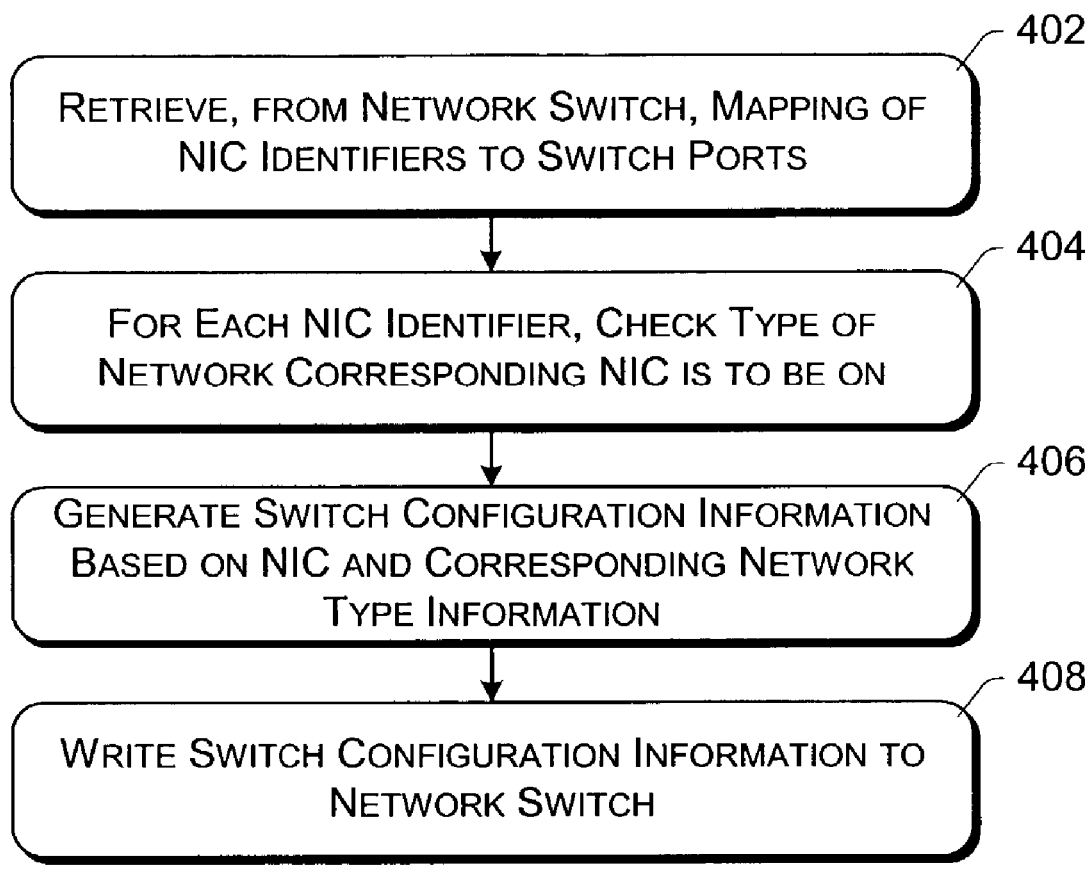
FIG. 8 is a flowchart illustrating an exemplary process for automated configuration of a network switch.

FIG. 8 is a flowchart illustrating an exemplary process 400 for automated configuration of a network switch. Process 400 is implemented by a device, such as staging server 140 of FIG. 2, and may be performed in software, firmware, hardware, or combinations thereof.

Initially, a mapping of NIC identifiers to switch ports is retrieved from the network switch (act 402). For each NIC identifier, a check is made as to the type of network the corresponding NIC is to be on (act 404). In situations where NICs table 172 of FIG. 3 uses NIC identifiers (e.g., NIC MAC addresses) as computing device identifiers, this checking can be performed by accessing the entries of NICs table 172 of FIG. 3, which include a mapping of NIC identifiers to network types. Switch configuration information is then generated based on the NIC and corresponding network type information (act 406), and this generated configuration information is written to the network switch (act 408).

It should be noted that other network devices can also be automatically configured analogous to the automatic configuring of network switches. The exact manner in which the data in the various tables is used to automatically configure other network devices can vary based on the network device. Such network devices may be, for example, part of a LAN, part of a storage area network (SAN) (e.g., allowing storage to be automatically created for new computing devices), and so forth.

Returning to FIG. 2, a fully automated system can also be implemented to add computing devices to customer location 134. This fully automated system could be managed by staging server 140, in redundant or non-redundant modes, or alternatively another device at customer location 134 (or alternatively elsewhere). During operation, the system administrator at location 134 would simply input, to the managing device, an indication that a new type of device (e.g., a new statistics server) is desired. Such a request could be input by manual entry of the new device name and type into a NICs table 172 of FIG. 3, sending an electronic mail message that includes the new device name and type to the managing device (which receives the message, retrieves the new device name and type from the message, and adds the new device name and type to NICs table 172), or alternatively in other manners. The fully automated process then orders the new device, and automated operating system and custom software installation is performed as discussed above.

Figure 9:
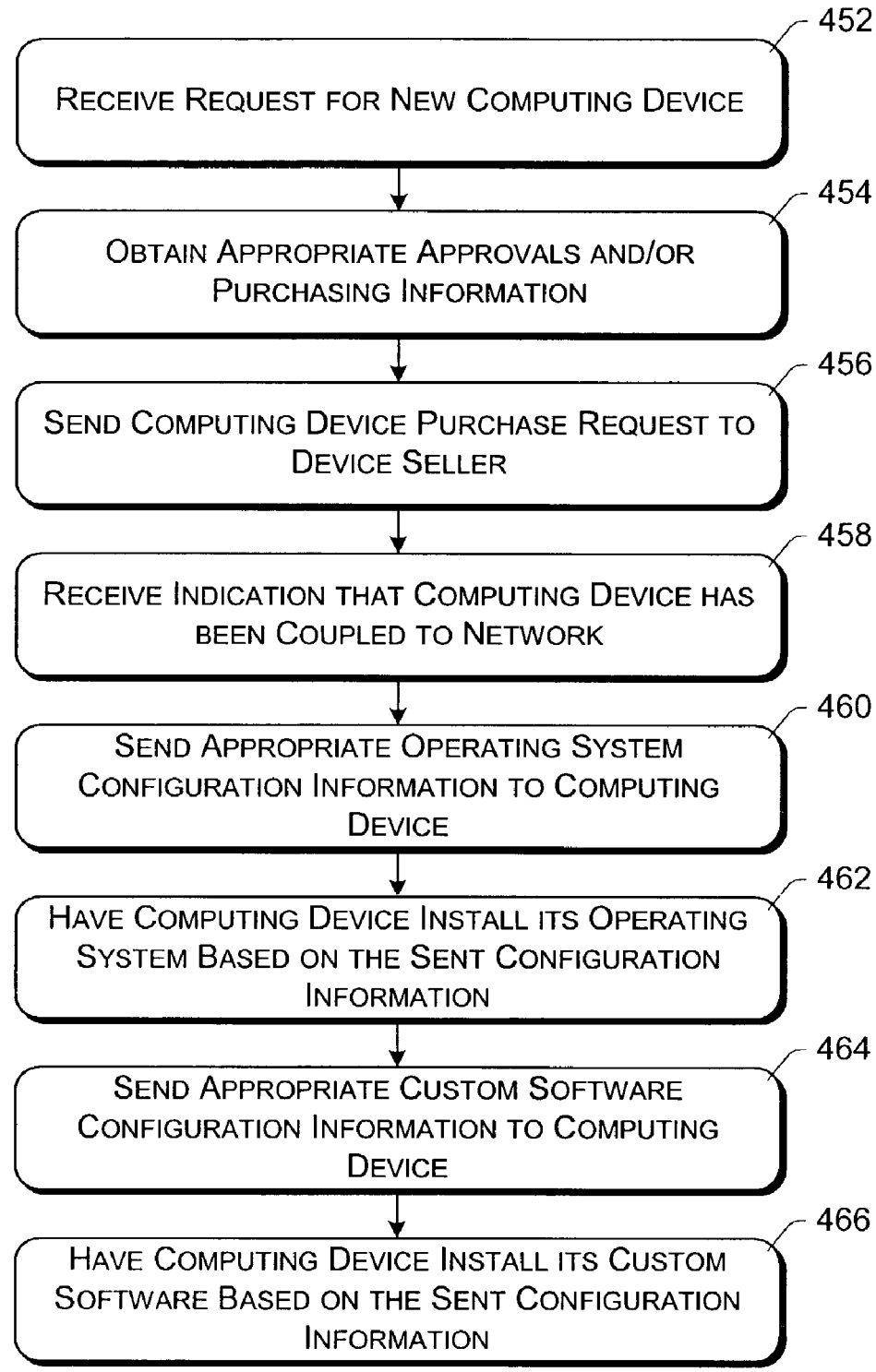
FIG. 9 is a flowchart illustrating an exemplary process for automated adding of a device to a customer location

FIG. 9 is a flowchart illustrating an exemplary process 450 for automated adding of a device to a customer location. Process 450 is implemented by a device, such as staging server 140 or another computing device of FIG. 2, and may be performed in software, firmware, hardware, or combinations thereof.

Initially, a request is received for a new computing device (act 452). The appropriate approvals and/or purchasing information is then obtained for the new computing device from an authorized source (act 454). Different operations may be involved in act 454, such as sending an electronic mail message or other indications to one or more individuals authorized to approve the purchase, sending electronic mail messages or other indications for a purchase order number to purchase the device, and so forth. Alternatively, no additional approval may be required and act 454 need not be performed.

Once any necessary approvals and/or purchasing information is obtained, a request to purchase the new computing device is sent to a device seller (act 456). This seller may be, for example, manufacturer 136 of FIG. 1, or alternatively a reseller of devices manufactured by manufacturer 136. Eventually, the computing device is received at the customer location and is coupled to the network(s). This coupling is performed, for example, by a user manually inserting a network cable into each NIC of the device and into a network switch or other network device at the customer location. Once coupled to the network an indication is received that the computing device has been coupled to the network (act 458). This may be a manual indication, such as manual entry of the indication into NICs table 172 of FIG. 3 by the system administrator, or may be an automatic indication, such as the advertising of the presence of the device on the network as soon as the device is powered on.

The appropriate operating system installation configuration information is then sent to the computing device (act 460) and the computing device installs its operating system based on the sent configuration information (act 462), analogous to the discussions above regarding automated operating system installation. The appropriate custom software configuration information is also sent to the computing device (act 464) and the computing device installs its custom software based on the sent information (act 466), analogous to the discussion above regarding automated custom software installation.

Thus, as can be seen in FIG. 9, the device addition process is very automated and involves little input from the system administrator to have a new computing device added to the customer location and set up as he or she desires.

Returning again to FIG. 2, in addition to providing automated setup as described herein, staging server 140 can also use the various information it maintains for asset tracking purposes. In situations where a large number of devices are present at customer location 134, such asset tracking can provide much desired information to the system administrator.

Figure 10:
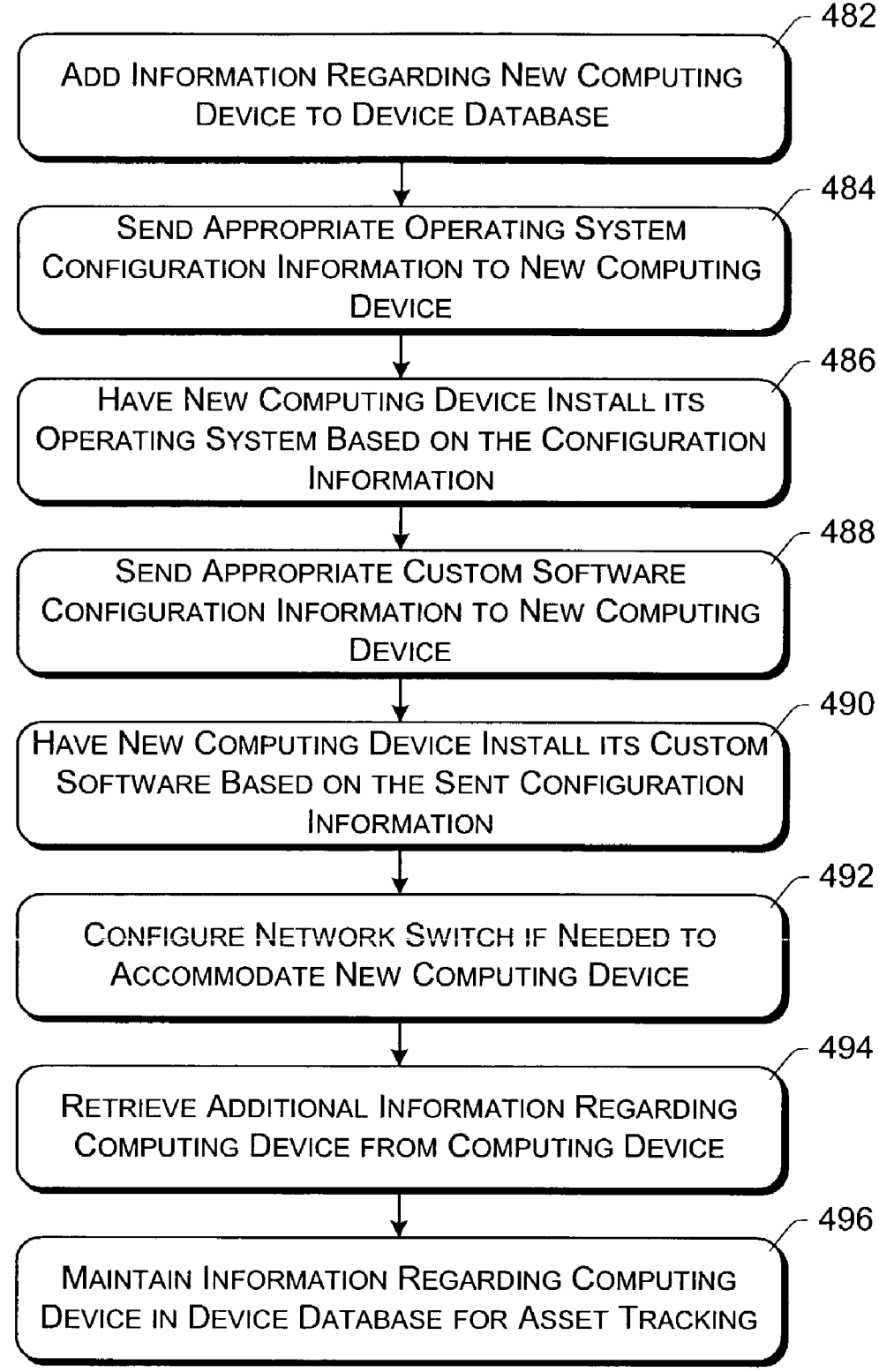
FIG. 10 is a flowchart illustrating an exemplary process for automated installation and asset tracking.

FIG. 10 is a flowchart illustrating an exemplary process 480 for automated installation and asset tracking. Process 480 is implemented by a device, such as staging server 140 or another computing device of FIG. 2, and may be performed in software, firmware, hardware, or combinations thereof.

Initially, information regarding a new computing device to be added at customer location 134 is added to the device database (act 482). This device database is made up of, for example, the tables 172, 174, and 176 of FIG. 3. Typically, the asset tracking information is included in NICs table 172.

The appropriate operating system installation configuration information is then sent to the new computing device (act 484) and the new computing device installs its operating system based on the sent configuration information (act 486), analogous to the discussions above regarding automated operating system installation. The appropriate custom software configuration information is also sent to the new computing device (act 488) and the computing device installs its custom software based on the sent information (act 490), analogous to the discussion above regarding automated custom software installation. The network switch(es) at the customer location are also re-configured, if needed, to accommodate the new computing device (act 492), analogous to the discussion above regarding automated network switch configuration.

Additional information regarding the computing device is then retrieved from the computing device (act 494). This additional information includes, for example, hardware and software characteristics of the device (e.g., components installed, versions of those components, basic input/output system (BIOS) settings and versions, etc.). The operating system installed on the computing device typically includes functionality that allows a variety of such hardware and software characteristics to be identified. For example, many of the Microsoft® Windows® operating systems include a Windows Management (WMI) service that can be queried using scripting languages to retrieve this information. This retrieved information from act 494, as well as the information previously added to the device database (e.g., the information added to NICs table 172 of FIG. 3) is maintained for asset tracking purposes (act 496).

Figure 11:
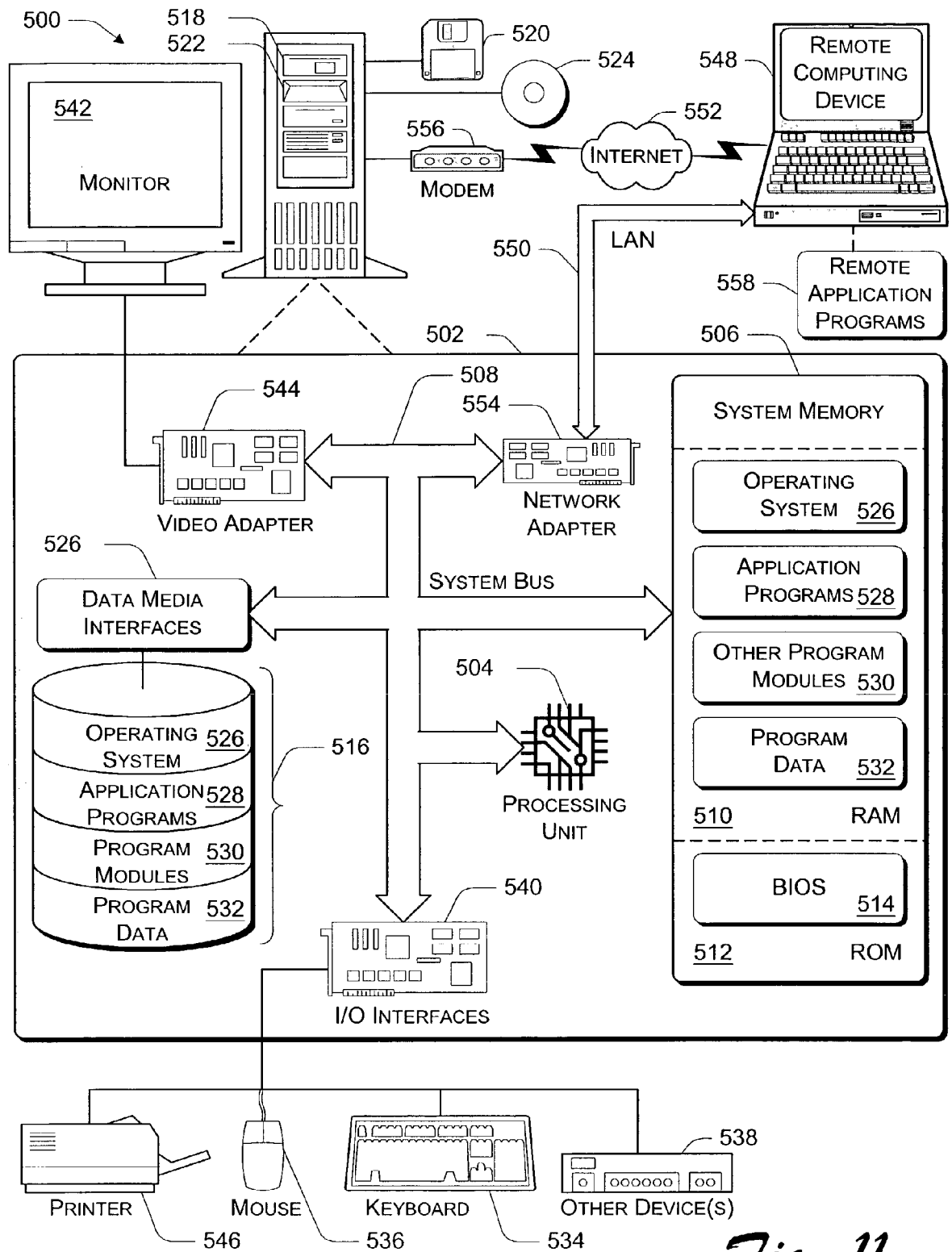
FIG. 11 illustrates an exemplary general computer environment, which can be used to implement the techniques described herein.

FIG. 11 illustrates an exemplary general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be, for example, a computing device 102 of FIG. 1, or a computing device (e.g., device 132) or staging server 140 of FIG. 2. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 11 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Various processes are illustrated by way of flowcharts herein. It should be noted that the acts involved in these processes can be performed in the order shown in the flowcharts, or alternatively in different orders. For example, in FIG. 10, the acts may be performed in the order shown, or alternatively in different orders (e.g., act 512 may be performed prior to act 510, or act 508 may be performed prior to act 506). By way of another example, in FIG. 9, the acts may be performed in the order shown, or alternatively in different orders (e.g., act 464 may be performed prior to act 462).

In the discussions herein, reference is made to network interface cards (NICs). It is to be appreciated that computing devices may be coupled to networks in different manners, such as by network connectors and circuitry integrated with the computing device motherboard, network connectors and circuitry external to the computing device and coupled to the computing device using different connections (e.g., a Universal Serial Bus (USB) connection), and so forth. It is to be appreciated that these alternate types of network connectors and circuitry can be used in manners analogous to, and in place of, the network interface cards (NICs) discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors of a computing device, causes the one or more processors to:

maintain mappings of identifiers of the computing device in profiles, wherein each profile indicates a type of functionality the corresponding computing device is to provide;

maintain software configuration information;

retrieve, from a network switch, a mapping of network interface card (NIC) identifiers to ports of the network switch;

identify for one or more of the network interface card (NIC) identifiers, a type of network the corresponding network interface card (NIC) is to be on;

generate switch configuration information based on the mappings and the identified network types;

write the switch configuration information to the network switch;

start a pre-execution environment on the computing device, wherein the pre-execution environment includes sufficient instructions to allow the computing device to access a staging server via a network and obtain operating system configuration information, stored in an SQL database, from a server, wherein the pre-execution environment is started prior to any network communication by the computing device corresponding to the pre-execution environment;

retrieve, based on an identifier of the computing device, the configuration information for the operating system of the computing device; and install, using the configuration information, the operating system on the computing device.

2. One or more computer readable media as recited in claim 1, wherein the one or more computer readable media having stored thereon the instructions that cause the one or more processors to start the pre-execution environment comprises an optical disk.

3. One or more computer readable media as recited in claim 1, wherein the one or more computer readable media having stored thereon the instructions that cause the one or more processors to start the pre-execution environment comprises a memory device of a network interface card (NIC).

4. One or more computer readable media as recited in claim 1, wherein the configuration information comprises software and hardware configuration information.

5. One or more computer readable media as recited in claim 1, wherein the configuration information comprises data to be included in an unattended install answer file.

6. One or more computer readable media as recited in claim 1, wherein the instructions that cause the one or more processors to retrieve configuration information for the operating system comprise instructions that cause the one or more processors to retrieve the configuration information from a server device in a same data center as the computing device is located in.

7. One or more computer readable media as recited in claim 1, wherein the instructions further cause the one or more processors to:

retrieve, based on the identifier, custom software configuration information for the computing device; and install, using the custom software configuration information, custom software on the computing device.

8. One or more computer readable media as recited in claim 1, wherein the instructions further cause the one or more processors to start the pre-execution environment, retrieve the configuration information, and install the operating system only if the device is a new device and no operating system has been previously installed on the computing device.

9. One or more computer readable media as recited in claim 1, wherein the instructions further cause the one or more processors to start the pre-execution environment, retrieve the configuration information, and install the operating system only if the device is to be rebuilt with the operating system.

10. One or more computer readable media as recited in claim 1, wherein the instructions further cause the one or more processors to start the pre-execution environment, retrieve the configuration information, and install the operating system only if one or more of the following applies: the device is a new device and no operating system has not been previously installed on the computing device, or the device is to be rebuilt with the operating system.

11. A method comprising:

determining whether an operating system is to be installed on a computing device;

if the operating system is not to be installed, then executing a previously installed operating system; and if the operating system is to be installed, then, maintaining mappings of identifiers of the computing device in profiles, wherein each profile indicates a e of functionality the corresponding computing device is to provide;

maintaining software configuration information;

retrieving, from a network switch, a mapping of network interface card (NIC) identifiers to ports of the network switch;

identifying, for one or more of the network interface card (NIC) identifiers, a type of network the corresponding network interface card (NIC) is to be on;

generating switch configuration information based on the mappings and the identified network types;

writing the switch configuration information to the network switch;

obtaining an identifier of the computing device, wherein the computing device comprises a pre-execution environment that includes sufficient instructions to allow the computing device to access a staging server via a network and obtain the operating system configuration information, stored in a SQL database, from a server, wherein the pre-execution environment is provided to the computing device prior to any network communication by the computing device corresponding to the pre-execution environment, using the identifier to obtain, from a remote device, the configuration information for the operating system, and using the configuration information to install the operating system on the computing device.

12. A method as recited in claim 11, wherein the identifier is one of a plurality of identifiers that uniquely identify the computing device.

13. A method as recited in claim 11, wherein the identifier of the computing device comprises a Medium Access Control (MAC) address of a network interface card (NIC) of the computing device.

14. A method as recited in claim 11, wherein using the identifier to obtain configuration information comprises:

using the identifier to obtain a device type that corresponds to the computing device, wherein the device type is mapped to a profile identifier that corresponds to the computing device, and wherein the profile identifier identifies the configuration information.

15. A method as recited in claim 11, wherein the configuration information comprises software and hardware configuration information.

16. A method as recited in claim 11, further comprising:

retrieving, based on the identifier, custom software configuration information for the computing device; and installing, using the custom software configuration information, custom software on the computing device.

17. One or more computer readable media having stored thereon a plurality of instructions that, when executed by one or more processors of a computing device, causes the one or more processors to:

maintain mappings of identifiers of the computing device in profiles, wherein each profile indicates a type of functionality the corresponding computing device is to provide;

maintain software configuration information;

retrieve, from a network switch, a mapping of network interface card (NIC) identifiers to ports of the network switch;

identify, for one or more of the network interface card (NIC) identifiers, a type of network the corresponding network interface card (NIC) is to be on;

generate switch configuration information based on the mappings and the identified network types;

write the switch configuration information to the network switch:

begin execution of an installed operating system on the computing device, wherein the computing device comprises a pre-execution environment, the pre-execution environment having sufficient instructions to allow the computing device to access a staging server via a network and obtain custom software configuration information, stored in a SQL database, from a sewer, wherein the computing device is not discovered by the network prior to the accessing the staging server;

retrieve, based on a unique identifier of the computing device, the custom software configuration information for the computing device; and install, using the custom software configuration information, the custom software on the computing device.

18. One or more computer readable media as recited in claim 17, wherein the custom software configuration information comprises information identifying which type of a plurality of types of devices the computing device is to be, and further comprises information identifying one or more application programs to be installed on the computing device in order for the computing device to provide the functionality associated with the type.

19. One or more computer readable media as recited in claim 17, wherein the identifier is a Medium Access Control (MAC) address of one of a plurality of network interface cards (NICs) of the computing device.

20. One or more computer readable media as recited in claim 17, wherein the instructions further cause the one or more processors to, prior to beginning execution of the installed operating system:

start the pre-execution environment on the computing device;

retrieve, based on the unique identifier of the computing device, configuration information for the operating system; and install, using the configuration information for the operating system, the operating system on the computing device.

21. One or more computer readable media as recited in claim 20, wherein the one or more computer readable media having stored thereon the instructions that cause the one or more processors to start the pre-execution environment comprises an optical disk.

22. One or more computer readable media as recited in claim 20, wherein the one or more computer readable media having stored thereon the instructions that cause the one or more processors to start the pre-execution environment comprises a memory device of a network interface card (NIC).

23. A method comprising:

maintaining mappings of identifiers of a computing device in profiles, wherein each profile indicates a type of functionality the corresponding computing device is to provide;

maintaining software configuration information;

retrieving, from a network switch, a mapping of network interface card (NIC) identifiers to ports of the network switch;

identifying, for one or more of the network interface card (NIC) identifiers, a type of network the corresponding network interface card (NIC) is to be on;

generating switch configuration information based on the mappings and the identified network types;

writing the switch configuration information to the network switch;

receiving, from a pre-execution environment on a computing device, a computing device identifier, wherein the pre-execution environment includes sufficient instructions to allow the computing device to access a staging server via a network and obtain operating system configuration information, stored in a SQL database, from the server, wherein the pre-execution environment is extent on the computing device prior to any network communication by the computing device corresponding to the pre-execution environment;

identifying, based on the computing device identifier, configuration information for an operating system of the computing device; and sending, to the computing device, the configuration information for installation of the operating system on the computing device.

24. A method as recited in claim 23, wherein the identifying comprises:

obtaining, based on the computing device identifier, a device type that corresponds to the computing device;

obtaining, based on the device type, a profile identifier that corresponds to the computing device; and obtaining, based on the profile identifier, the configuration information.

25. A method as recited in claim 23, wherein the configuration information includes components of the operating system.

26. A method comprising:

maintaining mappings of identifiers of a computing device in profiles, wherein each profile indicates a type of functionality the corresponding computing device is to provide;

maintaining software configuration information;

retrieving, from a network switch, a mapping of network interface card (NIC) identifiers to ports of the network switch;

identifying, for one or more of the network interface card (NIC) identifiers, a type of network the corresponding network interface card (NIC) is to be on;

generating switch configuration information based on the mappings and the identified network types;

writing the switch configuration information to the network switch;

receiving, from a computing device comprising a pre-execution environment that includes sufficient instructions to allow the computing device to access a staging server and obtain operating system and custom software configuration information, stored in a SQL database, from the server, a computing device identifier that uniquely identifies the computing device, wherein the pre-execution environment is extent on the computing device prior to any network communication by the computing device corresponding to the pre-execution environment;

identifying, based on the computing device identifier, custom software configuration information for the computing device; and sending, to the computing device, the custom software configuration information for installation of the custom software on the computing device.

27. A method as recited in claim 26, wherein the identifier is a Medium Access Control (MAC) address of one of a plurality of network interface cards (NICs) of the computing device.

28. A method as recited in claim 26, wherein the identifying comprises:
  obtaining, based on the computing device identifier, a device type that corresponds to the computing device;
  obtaining, based on the device type, a profile identifier that corresponds to the computing device; and
  obtaining, based on the profile identifier, the custom software configuration information.

29. A system comprising:
  one or more staging servers that maintain mappings of identifiers of computing devices in the system to profiles, wherein each profile indicates a type of functionality a corresponding computing device is to provide, and wherein the one or more staging servers maintain software configuration information, and wherein the one or more staging servers further retrieve, from a network switch, a mapping of network interface card (NIC) identifiers to ports of the network switch, identify, for one or more of the network interface card (NIC) identifiers, a type of network the corresponding network interface card (NIC) is to be on, generate switch configuration information based the mappings and the identified network types, write the switch configuration information to the network switch; and a computing device that starts a pre-execution environment, wherein the pre-execution environment includes sufficient instructions to allow the computing device to access a staging server via a network and obtain operating system and custom software configuration information, stored in a SQL database, from a server, and the computing device subsequently retrieves, from at least one of the one or more of the staging sewers, the configuration information for the operating system of the computing device, and installs the operating system using the configuration information, and wherein the computing device further retrieves the custom software configuration information for the computing device and installs, using the custom software configuration information, the custom software on the computing device, wherein the computing device is aware of the SQL database by virtue of the pre-execution environment prior to the accessing the staging server.

* * * * *